Dec. 29, 1925.  
A. C. VAN HOOYDONK  
1,567,213  
PISTON CONSTRUCTION  
Filed Dec. 1, 1924
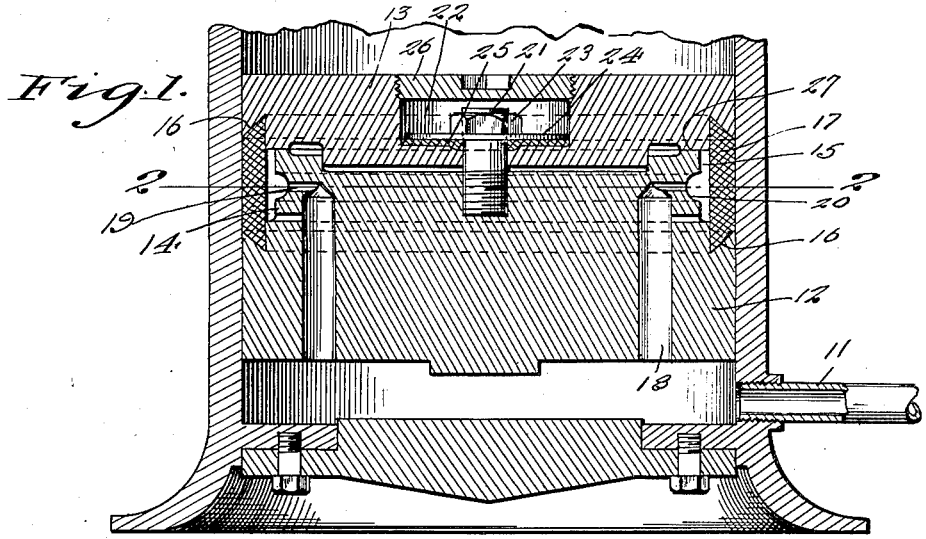
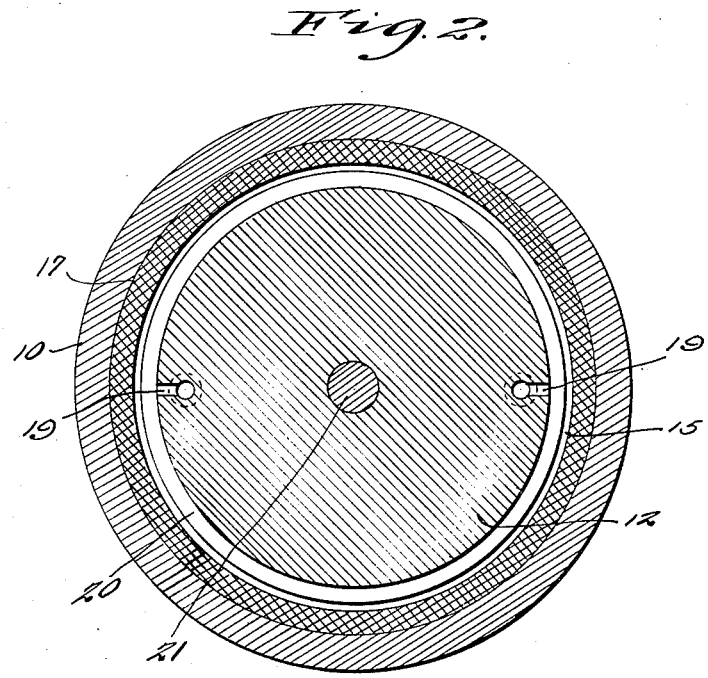
A. C. Van Hooydonk INVENTOR
BY Victor J. Evans
ATTORNEY
WITNESSES Patented Dec. 29, 1925.

1,567,213

UNITED STATES PATENT OFFICE.

ADRIAN C. VAN HOOYDONK, OF MONROE, MICHIGAN, ASSIGNOR OF ONE-HALF TO GEORGE J. SCHRAUDER, OF MONROE, MICHIGAN.

PISTON CONSTRUCTION.

Application filed December 1, 1924. Serial No. 753,302.

*To all whom it may concern:*

Be it known that I, ADRIAN C. VAN HOOYDONK, a citizen of the United States, residing at Monroe, in the county of Monroe and State of Michigan, have invented new and useful Improvements in Piston Constructions, of which the following is a specification.

This invention relates to improvements in pistons and has particular relation to fluid (liquid or air) actuated pistons, such as are commonly used without a piston rod, as in sausage stuffing machines, wherein the return stroke is effected by the weight of the piston.

In machines of this character it is necessary to provide a piston which will prevent the fluid from leaking past the piston on the working stroke, but will leave the piston free to return at the end of the working stroke.

For this purpose, the invention provides an expansible packing which is forced against the cylinder wall on the working stroke, by the operating fluid, the construction of the piston packing and the means of securing the packing in place being such as to force the packing outward against the cylinder, and in addition, force the packing against its seat within the piston and thus prevent the passage of fluid between the packing and piston and between the packing and cylinder.

Another object of the invention is the provision of a sectional piston structure in which the packing may be readily and effectually secured and which includes in addition to the leak-proof means above mentioned, means for preventing the passage of fluid between the joints of the sections, so that no fluid may pass the piston.

With the above and other objects in view, the invention further includes the following novel features and details of construction, to be hereinafter more fully described, illustrated in the accompanying drawings and pointed out in the appended claims.

In the drawings:—

Figure 1 is a vertical sectional view of a portion of a cylinder in which is located a piston constructed in accordance with the invention.

Figure 2 is a section on the line 2—2 of Figure 1.

Referring to the drawings in detail wherein like characters of reference denote corresponding parts, the reference character 10 indicates a cylinder which is provided adjacent its bottom with a pipe 11 which may lead to a suitable source of liquid or air supply so as to provide means whereby liquid or air under pressure may be introduced into the cylinder to act upon a piston.

In the present case, the piston is of sectional formation and includes a body 12 and a cap 13. The body is circumferentially reduced at one end as shown at 14, while the cap 13 extends beyond this reduced portion so as to provide an annular recess 15. The opposite walls of this recess are provided with annular substantially V-shaped grooves 16, one of the said grooves being located in the body 12 and the other in the cap 13. A flexible or compressible packing 17 has its opposite edges shaped to fit the grooves 16, while one face of the said packing engages the wall of the piston 10 and the opposite face is spaced from the inner wall of the recess 15.

The body 12 is provided with a plurality of axially extending passages 18, one end of which opens in the cylinder while their opposite ends terminate in relatively small diametrically disposed extensions 19 which communicate with the recess 15. Thus, fluid under pressure entering the cylinder will act upon the adjacent end of the pistons to force the latter outward and in addition will pass through the passages 18 against the inner face of the packing 17 and force the latter outward against the cylinder. In addition, the pressure of the liquid will act to force the inclined edges of the packing against the inclined outer walls of the V-shaped grooves. A leakproof joint will thus be effected between the packing and cylinder and between the packing and piston. The inner wall of the recess 15 is provided with an annular groove 20.

The cap 13 is secured to the body 12 by means of a threaded stud or screw 21, the latter being seated within a recess 22 provided in the cap. A nut 23 which is mounted upon this stud or screw bears against a washer 24 and positioned between this washer and the bottom of the recess 22 is a packing 25. The recess 22 is closed by a threaded cap 26.

The cap is thus forced into engagement with the body by adjusting the nut 23 upon the screw 21 and in order to prevent leakage between the body and cap, both said body and cap are provided with seats 27 and are forced into engagement with one another by adjusting the nut 23. Thus leakage of fluid between the body and cap and past the stud 21 will be prevented. When pressure is relieved from the piston, pressure of the packing 17 against the wall of the cylinder will be relieved and the piston will descend of its own weight.

The invention is susceptible of various changes in its form, proportions and minor details of construction and the right is herein reserved to make such changes as properly fall within the scope of the appended claims.

Having described the invention what is claimed is:—

1. A piston comprising a body, a cap secured to said body, said body being reduced at one end and the cap extending outward over such reduced end and defining an annular recess and having substantially V-shaped annular grooves in the opposed walls of the recess, an annular packing within the recess, said packing having its opposite edges shaped to fit the annular grooves and its inner periphery spaced from the adjacent wall of the recess, an annular transversely disposed seat between the body and cap at one end of the recess, means for securing the cap to the body and passages extending through the piston into the recess.

2. A piston comprising a body, a cap secured to said body, said body being reduced at one end and the cap extending outward over such reduced end and defining an annular recess and having substantially V-shaped annular grooves in the opposed walls of the recess, an annular packing within the recess, said packing having its opposite edges shaped to fit the annular grooves and its inner periphery spaced from the adjacent wall of the recess, an annular transversely disposed seat between the body and cap at one end of the recess, means for securing the cap to the body, an annular groove extending around the inner wall of the recess and passages extending through said body and into the last mentioned annular groove.

3. In combination with a cylinder, a piston comprising a body, a cap removably secured thereto, said body being reduced at one end and the cap extending outward over said end and defining one wall of an annular recess, said recess having substantially V-shaped annular grooves in its opposed walls, an annular packing located within and spaced from the inner wall of the recess, the opposite edges of the packing being shaped to fit the substantially V-shaped grooves, passages extending through the piston into the annular recess, whereby fluid under pressure may enter the recess and force the packing outward against the wall of the cylinder and an annular seat between the body and cap.

In testimony whereof I affix my signature.

ADRIAN C. VAN HOOYDONK.